Dec. 1, 1925. 1,563,840
H. D. DIRKS
COTTER PIN PULLER
Filed Sept. 11, 1924
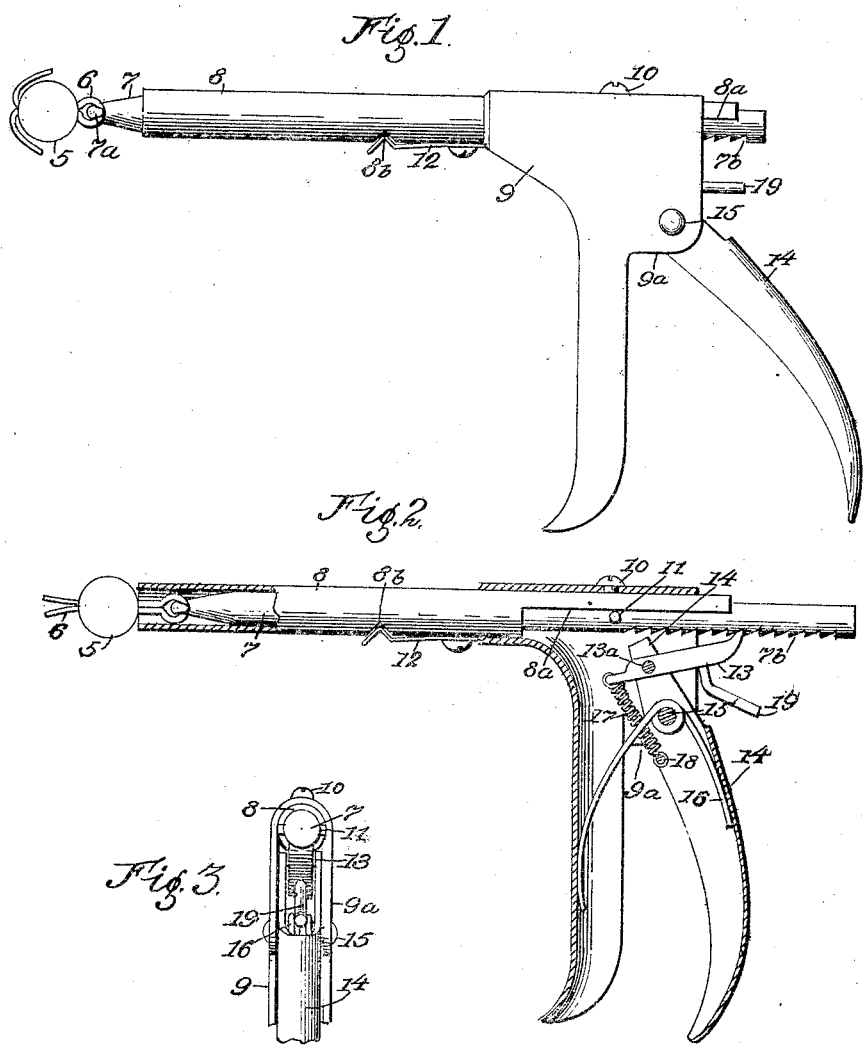

Patented Dec. 1, 1925.

1,563,840

UNITED STATES PATENT OFFICE.

HENRY D. DIRKS, OF MARION, IOWA.

COTTER-PIN PULLER.

Application filed September 11, 1924. Serial No. 737,091.

*To all whom it may concern:*

Be it known that I, HENRY D. DIRKS, a citizen of the United States, residing at Marion, in the county of Linn and State of Iowa, have invented certain new and useful Improvements in Cotter-Pin Pullers, of which the following is a specification.

This invention relates to hand tools for use in garages, and the object of the invention is to produce a tool adapted for the quick and convenient extraction of cotter-pins, regardless of the extent to which their prongs are bent.

As is well known, the use of cotter-pins in automobile construction is very general and extensive, both for holding pivot-pins in place, and for anchoring bolts and nuts. Many of these are in places difficult to reach with pliers, and even if accessible, are not easily withdrawn by pliers without first straightening the prongs. The device which is the subject of this invention is designed to draw them easily, from almost any location, and at any desired angle.

The invention is fully disclosed in the description and claims following, reference being had to the accompanying drawing, in which:—

Figure 1 is a side elevation of a tool embodying my invention. Fig. 2 is a sectional side elevation of the same, showing the internal mechanism. Fig. 3 is a fragmentary elevation of the same as seen from the handle end of the tool.

In the drawing, the numeral 5 denotes a bolt or pin, and 6 a cotter thrust through a hole in the bolt and with its tangs bent oppositely over the bolt to hold the pin securely in place. The tool for stripping the cotter out of the hole will now be described.

At one end of a plunger 7 is formed a small hook $7^a$ adapted to engage the eye of a cotter, as shown. As the hook is sometimes subjected to a rather severe strain, the plunger is in practice made of tool-steel, and the hook end suitably tempered for the work it has to do. In the present embodiment of the tool the plunger is cylindrical, and is mounted to slide in a tubular barrel 8 attached to a hand-hold or stock 9 analogous to a pistol-grip. This is herein shown as formed of drawn or pressed sheet metal, in the socket of which the barrel is secured, as by a screw 10. A cross-pin 11 sliding under a cut-away part of the barrel $8^a$ prevents the plunger from turning. A spring 12 engaging the plunger frictionally through a notch $8^b$ in the barrel, serves to hold the plunger from slipping, at any desired position. For a considerable distance from the rear end, the plunger is serrated at $7^b$ for engagement with a dog 13 pivoted at $13^a$ to a hand-lever 14. This is pivoted at 15 between the cheeks $9^a$ of the stock, with which it co-operates like the handles of a pair of pliers. A spring 16 serves to throw out the lever to the normal position shown in Fig. 1, where it is stopped by the nose $14^a$ striking the fixed stock. A small tension spring 17 attached to a pin 18 and the tail of the dog draws the dog into engagement with the notches of the plunger. The dog is disengaged from the notches by a trigger 19, and may then be pushed forward to the limit of its forward position.

To remove a cotter, the operator, holding the tool as he would a pistol, hooks the plunger hook in the eye of the cotter to be drawn. He then compresses the hand-lever shearwise in a series of successive movements. The first of these movements draws the tool up to the bolt, as shown in Fig. 2. By succeeding movements the cotter is stripped from the bolt, as indicated in the same figure, the end of the barrel serving as an abutment against the bolt, and the cotter being drawn into the barrel in the operation. This has the effect of straightening the legs or tangs of the cotter, so that it is in suitable condition to use again. Except in the case of large cotters, it is not essential that the plunger pull in line with the hole in the bolt, as the tool will strip out a cotter, however clinched, and at a wide angle to the axis of the cotter. This is a matter of great convenience, as the location of cotters, especially on automobiles, is sometimes such as to make a straight-out pull impossible.

It is to be noted that when pulled, the cotter is within the barrel, until the operator chooses to release it. It has had no chance to fly or fall, and so get lost. The tubular abutment thus has this advantage over an abutment that would guide, but not enclose the plunger.

As above indicated, the tool is restored to normal position by depressing the trigger, and pushing the plunger forward to the limit of its movement in this direction, when the cross-pin of the plunger strikes the shoulder of the barrel. The pressure of the spring 12 now holds the plunger from slipping back while the tool is being manipulated to engage another cotter.

Having thus described my invention, I claim:

1. A cotter-pin puller, comprising a hooked plunger, serrated for successive engagement of a dog, a tubular guide therefor provided with a hand-hold disposed laterally of the guide, to form a pistol grip, a lever pivoted to the hand-hold, and a dog connecting with the lever to engage the serrations of the plunger.

2. A cotter-pin puller, comprising a cylindrical plunger hooked at one end for engagement with the cotter eye, serrated on one side, and provided with lateral projections, a tubular guide therefor, having guides for said projections, a hand-hold attached to said tubular guide, an opposing hand-lever pivoted thereto, a dog having a disengaging trigger attached to the hand-lever, and a spring connected with the dog to press it into engagement with the serrations of the plunger.

3. A cotter-pin puller, comprising a hooked plunger, serrated for the successive engagement of a dog, a tubular guide-barrel for the plunger, a pistol-grip shaped hand-hold stock attached to the barrel, a lever pivoted to the side-cheeks of said stock, and opposed to the hand-hold, a distending spring therefor, a dog attached to the short arm of the lever, and a spring to press the dog into engagement with the serrated plunger.

In testimony whereof I affix my signature.

HENRY D. DIRKS.